United States Patent
Zhang et al.

(10) Patent No.: US 12,197,901 B2
(45) Date of Patent: Jan. 14, 2025

(54) AUTOMATIC PRECISION DEPENDENCIES MANAGEMENT

(71) Applicant: INTERNATIONAL BUSINESS MACHINES CORPORATION, Armonk, NY (US)

(72) Inventors: Bao Zhang, Beijing (CN); Jing Lu, Beijing (CN); Dong Hui Liu, Beijing (CN); Peng Hui Jiang, Beijing (CN); Xiao Yan Tang, Beijing (CN); Yong Yin, Beijing (CN); Jia Yu, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 112 days.

(21) Appl. No.: 18/085,615

(22) Filed: Dec. 21, 2022

(65) Prior Publication Data

US 2024/0211221 A1    Jun. 27, 2024

(51) Int. Cl.
*G06F 8/41* (2018.01)
*G06F 8/71* (2018.01)
*G06F 9/54* (2006.01)

(52) U.S. Cl.
CPC ............. *G06F 8/433* (2013.01); *G06F 8/71* (2013.01); *G06F 9/542* (2013.01)

(58) Field of Classification Search
None
See application file for complete search history.

(56) References Cited

U.S. PATENT DOCUMENTS

| | | | |
|---|---|---|---|
| 5,287,505 A * | 2/1994 | Calvert | G06F 11/0748 |
| 7,562,356 B2 | 7/2009 | DeFolo | |
| 8,621,453 B2 | 12/2013 | Wookey | |
| 9,182,966 B2 | 11/2015 | Avery et al. | |
| 10,303,465 B1 * | 5/2019 | Potter | H04L 67/34 |
| 10,445,081 B2 | 10/2019 | Christopher et al. | |
| 10,942,734 B2 | 3/2021 | Schneider et al. | |
| 11,340,914 B2 | 5/2022 | Weimer | |
| 11,422,799 B1 * | 8/2022 | Weinstein | G06N 5/01 |

(Continued)

FOREIGN PATENT DOCUMENTS

CN    113722704    11/2021

OTHER PUBLICATIONS

Anonymous, "System and Method of Fix Dependencies Management when Generating and Applying on Software", ip.com, Dec. 2, 2015; 12 Pages.

*Primary Examiner* — Qing Chen
(74) *Attorney, Agent, or Firm* — Jared Chaney; Andrew D. Wright; Calderon Safran & Wright P.C.

(57) ABSTRACT

In a first aspect of the invention, there is a computer-implemented method including: generating, by one or more processors, dependency version information for a target software application, based on activity of a compiler registered with an event handler; generating, by the one or more processors, one or more dependency sections with a dependency list for the target software application, wherein the dependency list incorporates the dependency version information; and building, by the one or more processors, a software package with the one or more dependency sections with the dependency list for the target software application.

20 Claims, 14 Drawing Sheets

(56) References Cited

U.S. PATENT DOCUMENTS

| | | | |
|---|---|---|---|
| 2003/0167358 A1* | 9/2003 | Marvin | G06F 9/465 |
| | | | 719/328 |
| 2007/0168956 A1* | 7/2007 | Moore | G06F 8/60 |
| | | | 717/120 |
| 2008/0196024 A1 | 8/2008 | Barfield et al. | |
| 2010/0257517 A1* | 10/2010 | Sriram | G06F 8/658 |
| | | | 717/168 |
| 2011/0107326 A1* | 5/2011 | Dehaan | G06F 8/61 |
| | | | 717/175 |
| 2012/0167048 A1* | 6/2012 | Walsh | G06F 8/71 |
| | | | 717/122 |
| 2016/0110183 A1* | 4/2016 | Fu | G06F 8/63 |
| | | | 717/169 |
| 2021/0397426 A1 | 12/2021 | Du et al. | |
| 2022/0083667 A1* | 3/2022 | Anwar | G06F 8/75 |
| 2022/0100496 A1* | 3/2022 | Haster | G06F 9/547 |
| 2023/0098941 A1* | 3/2023 | Rizzi | G06F 8/433 |
| | | | 717/170 |
| 2023/0333837 A1* | 10/2023 | Lin | G06F 8/65 |
| 2024/0111512 A1* | 4/2024 | Liu | G06F 21/577 |

* cited by examiner

AUTOMATIC PRECISION DEPENDENCIES MANAGEMENT

BACKGROUND

Aspects of the present invention relate generally to software builds and, more particularly, to ensuring precision software dependencies in software builds.

A software dependency is an external standalone library that can be as small as a single file or as big as multiple files and folders organized into packages to perform a specific task. Software dependencies are created by system/software providers manually and are managed by system/software users manually.

SUMMARY

In a first aspect of the invention, there is a computer-implemented method including: generating, by one or more processors, dependency version information for a target software application, based on activity of a compiler registered with an event handler; generating, by the one or more processors, one or more dependency sections with a dependency list for the target software application, wherein the dependency list incorporates the dependency version information; and building, by the one or more processors, a software package with the one or more dependency sections with the dependency list for the target software application.

In another aspect of the invention, there is a computer program product including one or more computer readable storage media having program instructions collectively stored on the one or more computer readable storage media. The program instructions are executable to: generate dependency version information for a target software application, based on activity of a compiler registered with an event handler; generate one or more dependency sections with a dependency list for the target software application, wherein the dependency list incorporates the dependency version information; and build a software package with the one or more dependency sections with the dependency list for the target software application.

In another aspect of the invention, there is system including a processor set, one or more computer readable storage media, and program instructions collectively stored on the one or more computer readable storage media. The program instructions are executable to: generate dependency version information for a target software application, based on activity of a compiler registered with an event handler; generate one or more dependency sections with a dependency list for the target software application, wherein the dependency list incorporates the dependency version information; and build a software package with the one or more dependency sections with the dependency list for the target software application.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
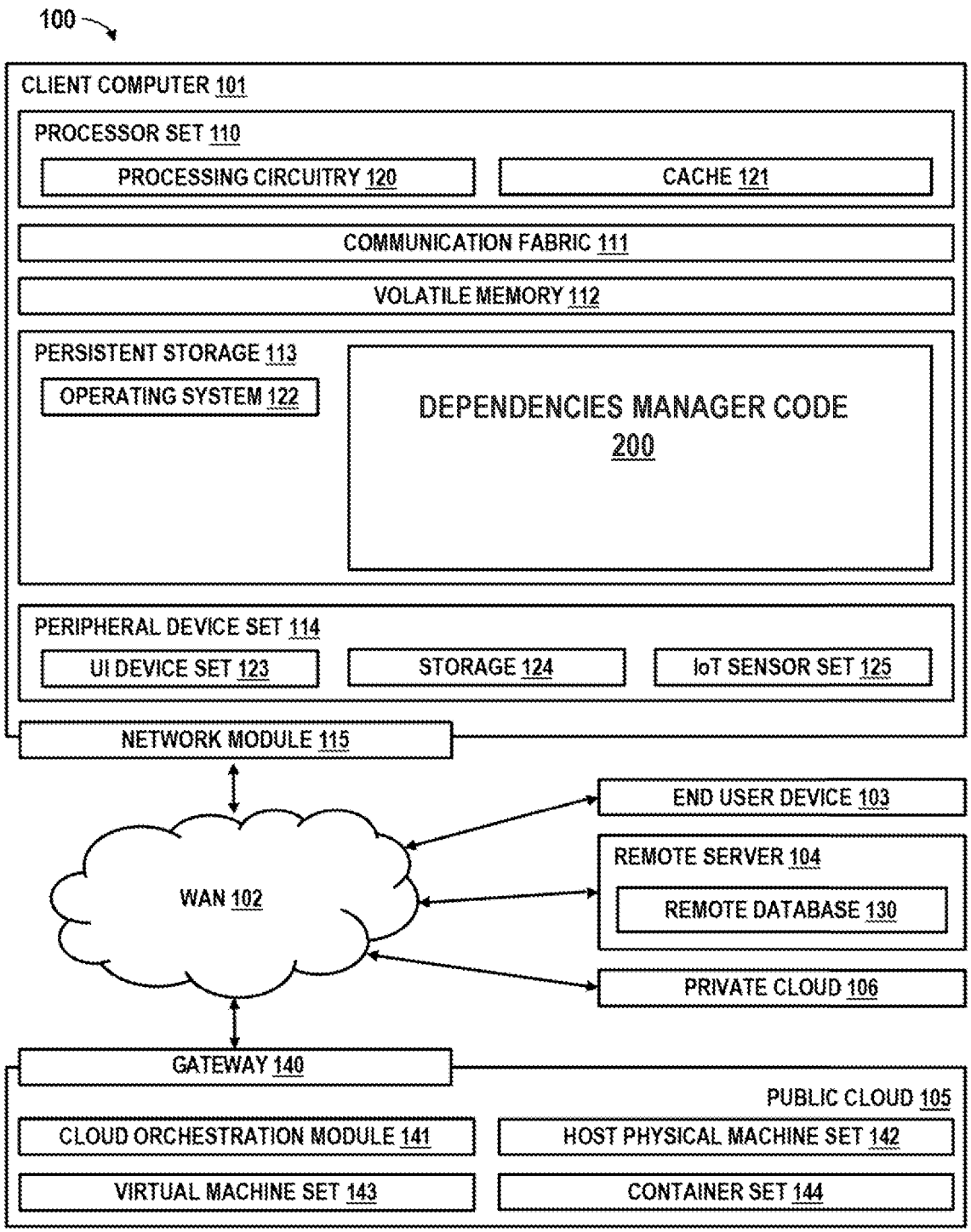
FIG. 1 depicts a computing environment according to an embodiment of the present invention.

Aspects of the present invention relate generally to managing dependencies for software builds, and, more particularly, to computing systems and methods that consistently and automatically determine and implement an authoritatively precise list of software dependencies including all necessary dependency version information for software builds. It is often hard to determine and control dependencies precisely and such process is quite expensive and highly depends on developers' and system administrators' personal experience, especially for critical issues. The condition in which high numbers of required software dependencies of specific versions have proliferated to the point of unmanageability and consistently consume major amounts of time to try to track down and install for each of a number of software installations, potentially on each of a number of computing systems, is a well-known persistent challenge for system administrators and users to handle their system and applications. There is no consistent, precise dependency list for every software build provided by current conventional package tools in the prior art.

Many software applications have many dependencies and long chains of dependencies, and may even have conflicting dependencies and/or circular dependencies. A typical software application depends on many libraries, often requiring lengthy downloads and large amounts of disk space. An application may be built on a given third party library, but further applications do not require that library. A software application may depend on a software library liba, which depends on another software library libb, and so forth in a nested chain of dependencies, which ultimately depends on yet another software library libs; e.g., on attempting to install the application, the user is prompted to install liba first. On attempting to install liba, the user is then prompted to install libb, and so on, potentially with a high number of iterations.

Applications may have conflicting dependencies and circular dependencies, for example. With conflicting dependencies, solving the dependencies for one software application may break the compatibility of another, and resolving compatibility for that application may break the dependencies for yet other applications, in a potentially unknown number of iterations. If an application app1 depends on a software library named libfoo version 1.2, and another application app2 depends on libfoo version 1.3, and different versions of libfoo cannot be simultaneously installed, then app1 and app2 cannot simultaneously be used. With circular dependencies, if application A depends upon and can't run without a specific version of application B, but application B, in turn, depends upon and can't run without a specific version of application A, then upgrading either application will break the other. Package managers may even have their own dependencies. Some package managers are prone to have conflicts between packages of their own repositories.

Examples and aspects of the present disclosure may mitigate and resolve all of these and other challenges and shortcomings in the conventional art. According to aspects of the invention, a dependency management software system or computing system may consistently and automatically determine and implement an authoritatively precise list of software dependencies including all necessary dependency version information for software builds. In embodiments, a dependencies management software system may generate dependency version information for a target software application, and may generate one or more dependency sections with a precise dependency list for the target software application, wherein the dependency list incorporates the dependency version information. In various embodiments, a dependencies management system may build a software package with the one or more dependency sections with the precise dependency list for the target software application. In this manner, implementations of the invention may consistently and automatically resolve software dependencies of arbitrary complexity, freeing software developers and system administrators from having to try to manually figure out, track, manage, and troubleshoot dependencies and dependency versions, and save them a great deal of time, mental effort, frustration, and lost productivity.

In various examples, a dependency management system may register a compiler (e.g., a non-incremental compiler and/or an incremental compiler) with an event handler that generates dependency version information. The dependency management system may comprise a binder, link-editor, and/or package builder, or may modify an existing binder, link-editor, and/or package builder, which may generate a direct dependency section and an explicit transitive dependency section for a current product with a precise dependency list. A dependency management system runtime may identify a software implicit transitive dependency section and supplement the dependency list in unit testing (UT), function verification testing (FVT), and system verification testing (SVT), and running on a user's platform. The dependency management system may comprise a package builder or may modify an existing package builder, which may build a package, such as a program temporary fix (PTF) package in some examples, with one or more dependency sections for a current or target software build or product with the precise dependency list. A binder, link-editor, package builder, and/or package tool comprised in and/or modified by a dependency management system of aspects of this disclosure may patch one or more target software applications, which may include, e.g., applications, projects, or systems, with the precise dependency list, and rebind the executable to complete patching. A dependency management system in aspects of this disclosure may thereby resolve any potential conflicts or inconsistencies in the dependencies, and ensure precision dependencies for the executable, in various examples.

Implementations of this disclosure are necessarily rooted in computer technology. For example, steps of registering a compiler with an event handler that generates the dependency version information, building a software package with the one or more dependency sections with the precise dependency list for the target software application, patching the target software application with the software package with the one or more dependency sections with the dependency list for the target software application, and rebinding a software executable based on the target software application patched with the software package, are necessarily computer-based and cannot be performed in the human mind. Steps such as registering a compiler with an event handler that generates the dependency version information, building a software package with the one or more dependency sections with the precise dependency list for the target software application, patching the target software application with the software package with the one or more dependency sections with the dependency list for the target software application, and rebinding a software executable based on the target software application patched with the software package are, by definition, performed by a computer and cannot conceivably be performed in the human mind (or with pen and paper). Further, some aspects of various examples of this disclosure are intended to replace efforts by human programmers to mentally and manually keep track of and ensure consistent and non-conflicting dependencies on every build of an executable. The difficulties and widespread failures of software engineers generally to achieve these purposes is notoriously well-known in the art. That notoriety of the essential impossibility of consistently ensuring proper and non-conflicting dependencies on every build of an executable offers conclusive indication of the impossibility of achieving the performance of examples of the present application by the mental and manual operation of human mind and hands. Further aspects of the present disclosure are beyond the capability of mental effort not only in scale and consistency but also technically and categorically.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

FIG. 1 depicts a computing environment 100 according to an embodiment of the present invention. Computing environment 100 contains an example of an environment for the execution of at least some of the computer code involved in performing the inventive methods, such as dependencies manager code 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments.

Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
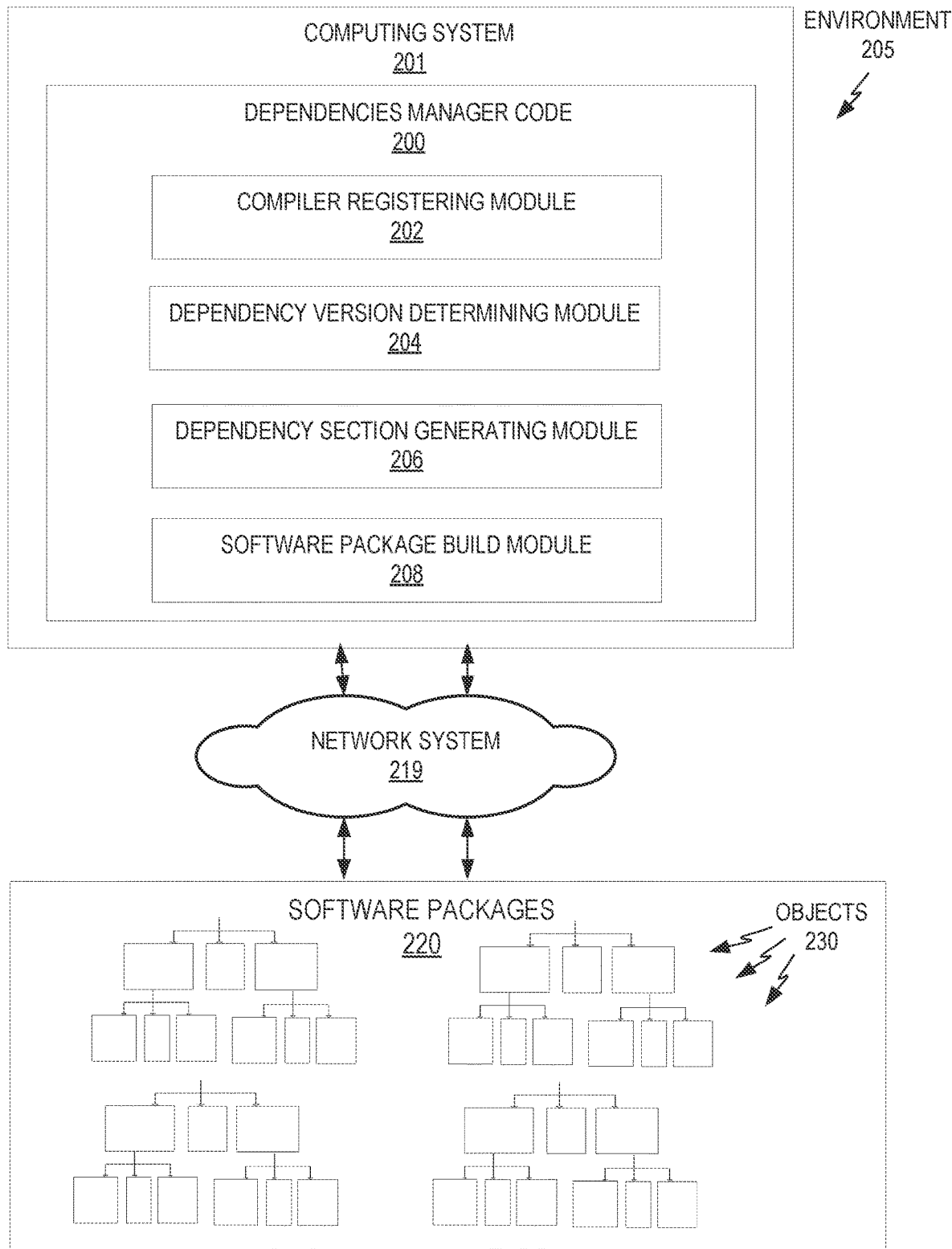
FIG. 2 shows a block diagram of an exemplary environment in accordance with aspects of the invention.

FIG. 2 shows a block diagram of an exemplary environment 205 in accordance with aspects of the invention. In embodiments, computing system 201 implements example dependencies manager code 200 of this disclosure, as introduced above. Computing system 201 may be implemented in a variety of configurations for implementing, storing, running, and/or embodying dependencies manager code 200. Computing system 201 in various examples may comprise a cloud-deployed computing configuration, comprising processing devices, memory devices, and data storage devices dispersed across data centers of a regional or global cloud computing system, with various levels of networking connections, such that any or all of the data, code, and functions of dependencies manager code 200 may be distributed across this cloud computing environment. Dependencies manager code 200 may thus constitute and/or be considered a dependencies manager application or a dependencies manager system, and may comprise and/or be constituted of one or more software systems, a combined hardware and software system, one or more hardware systems, components, or devices, one or more methods or processes, or other forms or embodiments. In other examples, computing system 201 may comprise a single laptop computer, or a specialized machine learning workstation equipped with one or more specialized-grade graphics processing units (GPUs) and/or other specialized processing elements, or a collection of computers networked together in a local area network (LAN), or one or more server farms or data centers below the level of cloud deployment, or any of a wide variety of computing and processing system configurations, any of which may implement, store, run, and/or embody dependencies manager code 200. Dependencies manager code 200 may interact via network system 219 with any other proximate or network-connected computing systems to perform builds of software packages 220, including of any software objects 230 comprised therein.

In embodiments, computing system 201 of FIG. 2, and any one or more computing devices or components thereof, comprises dependencies manager code 200. Dependencies manager code 200 comprises compiler registering module 202, dependency version determining module 204, dependency section generating module 206, and software package build module 208, each of which may comprise modules of code of block 200 of FIG. 1. These modules of the code of block 200 are executable by the processing circuitry 120 of FIG. 1 to perform the inventive methods as described herein. Compiler registering module 202 may register a compiler with an event handler, and may detect dependencies and dependency versions directly from the compiler. Dependency version determining module 204 may determine the dependency version information for the target software application. Dependency section generating module 206 may generate a precise dependency list for the target software application, wherein the dependency list incorporates the dependency version information. Software package build module 208 may build software packages with the one or more dependency sections with the precise dependency list for the target software application. Computing system 201, and any one or more computing devices or components thereof, may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks, fewer devices and/or networks; different devices and/or networks; or differently arranged devices and/or networks than illustrated in FIG. 2.

Figure 3:
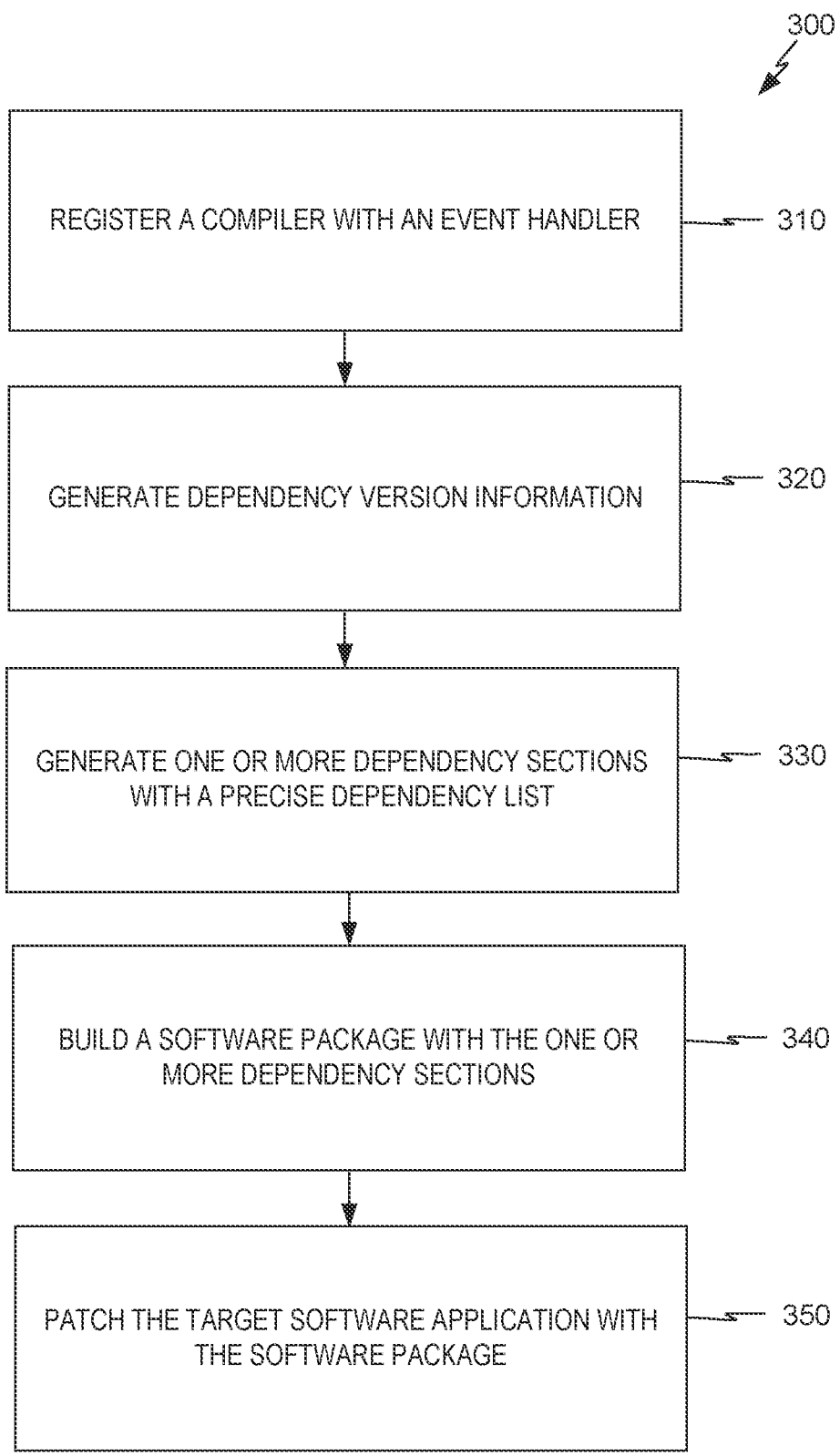
FIG. 3 shows a flowchart of an exemplary method in accordance with aspects of the invention.

FIG. 3 shows a flowchart of an exemplary method in accordance with aspects of the present invention. Steps of the method may be carried out in the environment of FIGS. 1 and/or 2 and are described with reference to elements depicted in FIGS. 1 and 2, including dependencies manager code 200, in accordance with various examples.

In embodiments, and as described with respect to FIG. 2, as well as in the subsequent figures as described below, in step 310, dependencies manager code 200 may register a compiler with an event handler configured to determine and generate dependency and dependency version information for a target software application from compiler events of a compiler. In step 320, dependencies manager code 200 may generate dependency version information for the target software application. In step 330, dependencies manager code 200 may generate one or more dependency sections with a precise dependency list for the target software application, wherein the dependency list incorporates the dependency version information. In step 340, dependencies manager code 200 may build a software package with the one or more dependency sections with the precise dependency list for the target software application. In step 350, dependencies manager code 200 may patch the target software application with the software package with the one or more dependency sections with the precise dependency list for the target software application.

Figure 4:
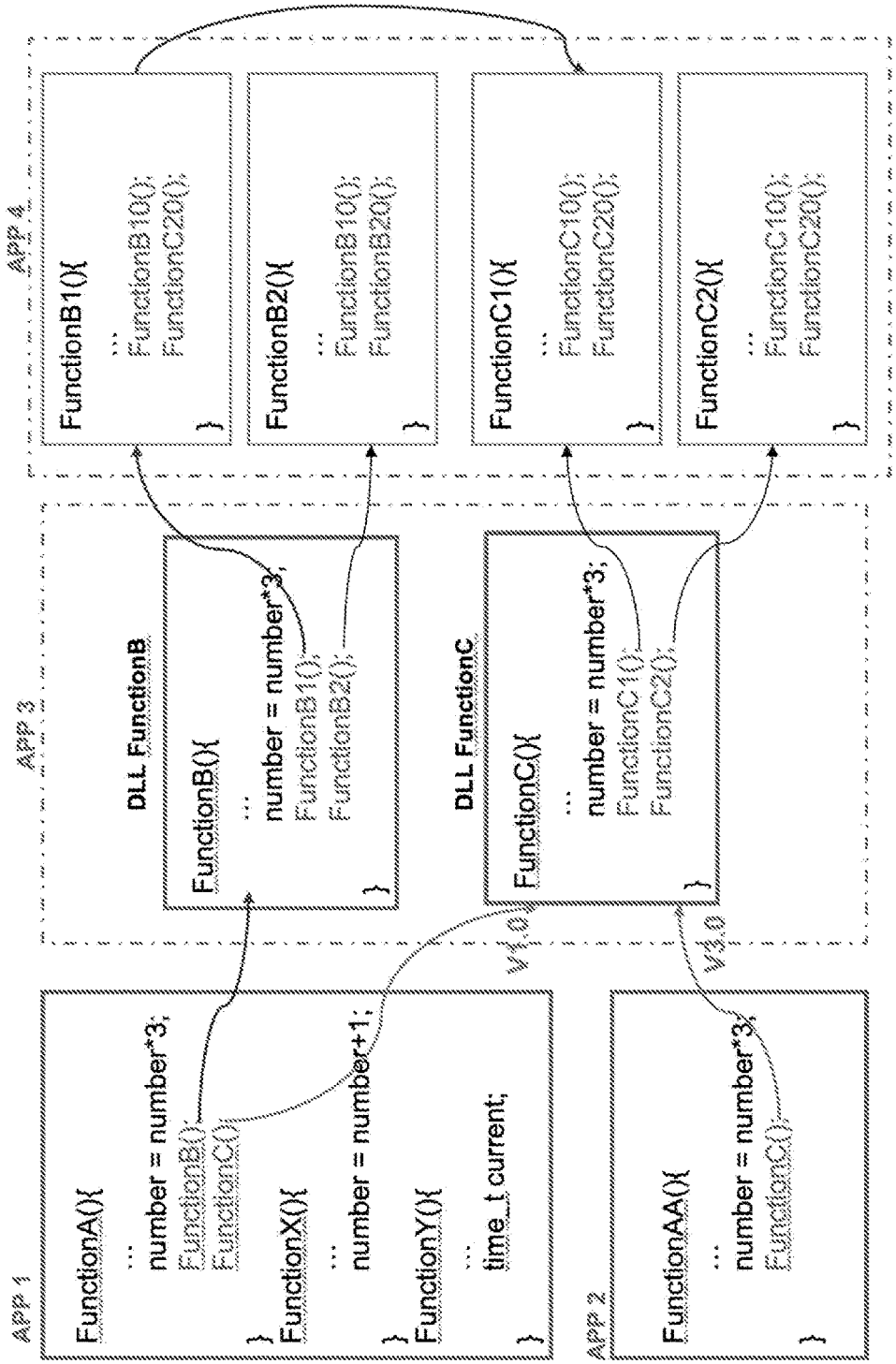
FIG. 4 depicts an illustrative example block diagram of a software executable comprising four software applications which have an illustrative nest of software dependencies, including conflicting dependencies between different versions of various functions.

FIG. 4 depicts an illustrative example block diagram of a software executable 400 comprising four software applications which have an illustrative nest of software dependencies, including conflicting dependencies between different versions of various functions, as described above. As shown, a software application may comprise multiple component software applications, which in turn may comprise numbers of functions, objects, libraries, and other components, and which may form a complex, nesting structure of dependencies, including on multiple different versions of each of multiple different dependencies, which themselves may comprise functions, objects, libraries, and other software components. Aspects of dependencies manager code 200 in accordance with illustrative aspects of this disclosure may address and resolve the conflicting dependencies and provide consistent, precision, mission-assured dependencies management for iterative builds of software executable 400.

Figure 5:
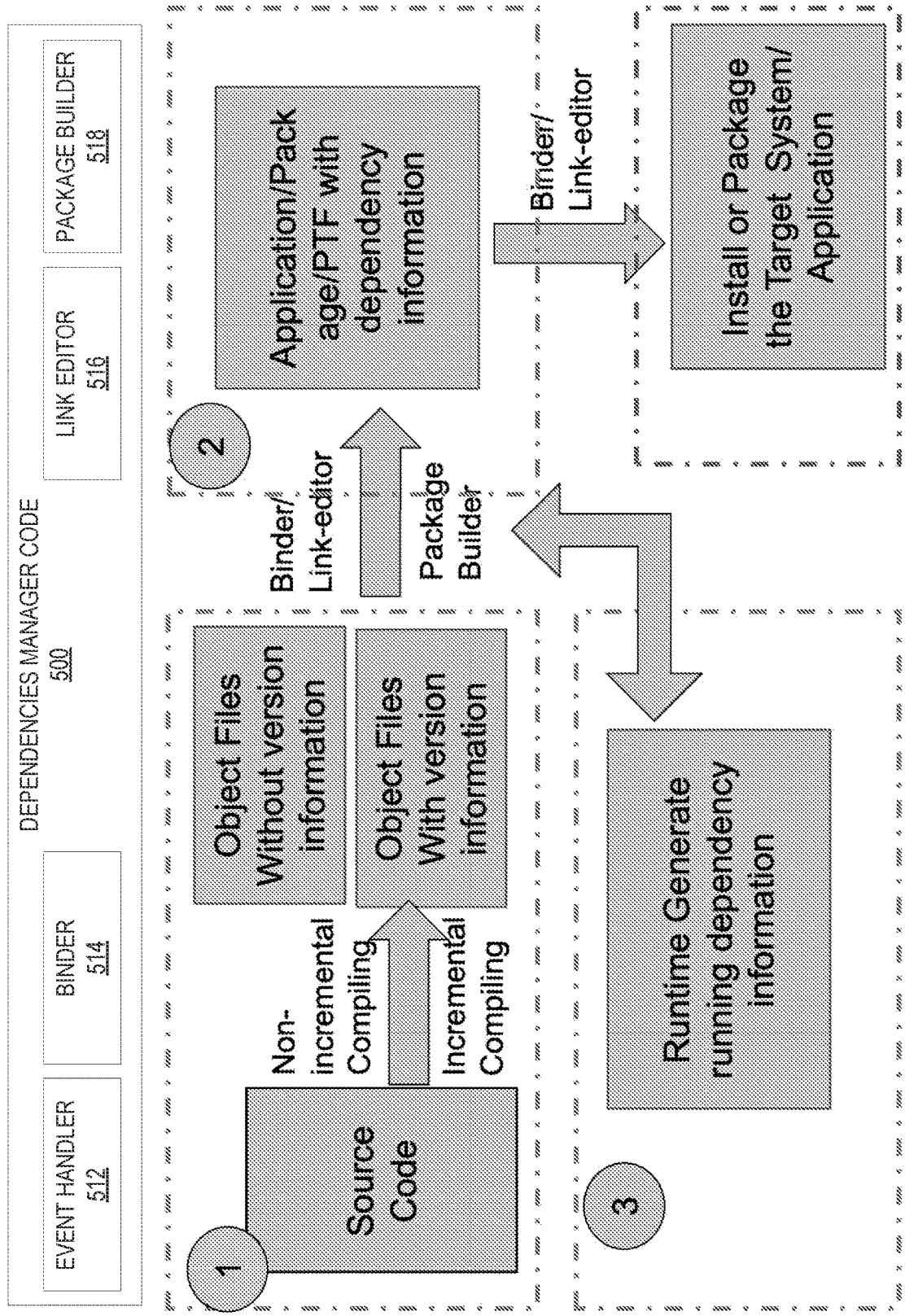
FIG. 5 depicts an illustrative example logical block diagram of a dependencies manager code interacting with and managing dependencies for a software build, in accordance with illustrative aspects of this disclosure.

FIG. 5 depicts an illustrative example logical block diagram of a dependencies manager code 500 interacting with and managing dependencies for a software build, in accordance with illustrative aspects of this disclosure Dependencies manager code 500 may be an implementation of dependencies manager code 200 of FIGS. 1 and 2, in various examples. Dependencies manager code 500 may implement a method to effectively deliver patches and/or install packages for applications, projects, or systems with precise dependency information consistently and automatically determined and generated.

Dependencies manager code 500 may comprise or modify and interact with an event handler 512 and a binder 514, a link editor 516, and/or a package builder 518. Binder 514, link-editor 516, and/or package builder 518 may be comprised in dependencies manager code 500, or may be pre-existing and may be supplemented and/or modified in accordance with aspects of this disclosure by dependencies manager code 500, such that in such a modified form they may function as aspects or components of dependencies manager code 500. Dependencies manager code 500 may register a compiler (as in step 310 of FIG. 3), which may be a non-incremental compiler and/or an incremental compiler, or multiple compilers in other examples. In various examples, dependencies manager code 500 may register a compiler with event handler 512 (as in step 310 of FIG. 3), which may detect events with the compiler, such as events indicative of the activity and presence of software components that act as dependencies of a target software package, and determine and generate dependency version information of those dependencies.

Binder 514, link-editor 516, and/or package builder 518 may function as a dependency section generator and may generate dependency information (as in step 320 of FIG. 3) and generate one or more dependency sections (as in step 330 of FIG. 3), such as a direct dependency section that lists detected direct software dependencies of the target software application and/or an explicit transitive dependency section that lists detected explicit transitive software dependencies of the target software application, such that the one or more dependency sections comprise a precise dependency list of dependencies and their versions for the target software application (as in step 330 of FIG. 3). Dependencies manager code 500 may, in or with a runtime, identify a software implicit transitive dependency section and supplement the dependency list (also examples of steps 320 and 330 of FIG. 3, from runtime rather than from the compiler) in unit testing (UT), function verification testing (FVT), and system verification testing (SVT), and running on a user's platform. The implicit transitive dependency section may list further dependencies that dependencies manager code 500 detects from the compiler in any one or more testing regimes that are not detected from the compiler as direct or explicit transitive dependencies prior to performing software test engineering processes (also examples of steps 320 and 330 of FIG. 3). Package builder 518 may build a package, such as a program temporary fix (PTF) package in some examples, with the one or more dependency sections for the target software application, e.g., a current software product, with the precise dependency list (as in step 340 of FIG. 3) Binder 514, link-editor 516, and/or package builder 518, and/or another package tool may patch the target applications, projects, or systems with the precise dependency list, and may rebind the executable to complete patching (as in step 350 of FIG. 3), thereby resolving any potential conflicts or inconsistencies in the dependencies, and ensuring precision dependencies for the executable.

Thus, in various examples, dependencies manager code 500 may further register a compiler with an event handler (as in step 310 of FIG. 3) that generates the dependency version information, prior to determining and generating dependency version information. Dependencies manager code 500 may generate dependency version information for a target software application (as in step 320 of FIG. 3). Dependencies manager code 500 generating the dependency version information for the target software application based on the activity of the compiler may include an event handler comprised in dependencies manager code 500 observing the compiler process or execute dependencies of the target software application, and determining the dependency version information of the dependencies (also as in step 320 of FIG. 3). The event handler comprised in dependencies manager code 500 may thus determine the dependencies and their version information directly by directly detecting and/or observing them as they come up and are executed by the compiler, which may thereby ensure that the dependency information is authoritative and complete (also in step 320 of FIG. 3). Dependencies manager code 500 may generate one or more dependency sections with a precise dependency list for the target software application, wherein the dependency list incorporates the dependency version information (as in step 330 of FIG. 3). Dependencies manager code 500 may build a software package with the one or more dependency sections with the precise dependency list for the target software application (as in step 340 of FIG. 3). Dependencies manager code 500 may patch the target software application with the software package with the one or more dependency sections with the precise dependency list for the target software application (as in step 350 of FIG. 3).

In various examples, dependencies manager code 500 generating the one or more dependency sections with the dependency list for the target software application comprises generating a direct dependency section and an explicit transitive dependency section. Generating the one or more dependency sections with the dependency list for the target software application may include identifying an implicit transitive dependency section, and supplementing the dependency list based on the implicit transitive dependency section. Identifying the implicit transitive dependency section may be based on one or more of unit testing (UT), function verification testing (FVT), system verification testing (SVT), and running on one or more target platforms. Identifying the implicit transitive dependency section may be performed in a runtime.

Generating the one or more dependency sections with the dependency list for the target software application may include generating version information for one or more dependencies in the dependency list, including if there are multiple versions of the same dependency. Dependencies manager code 500 may generate the one or more dependency sections with the dependency list for the target software application using at least one of a binder, a link editor, and package builder. Building the software package with the dependency section for the target software application with the dependency list may include building a program temporary fix (PTF) package. Dependencies manager code 500 may further bind or rebind a software executable based on the target software application patched with the software package with the precise dependency list.

Figure 6:
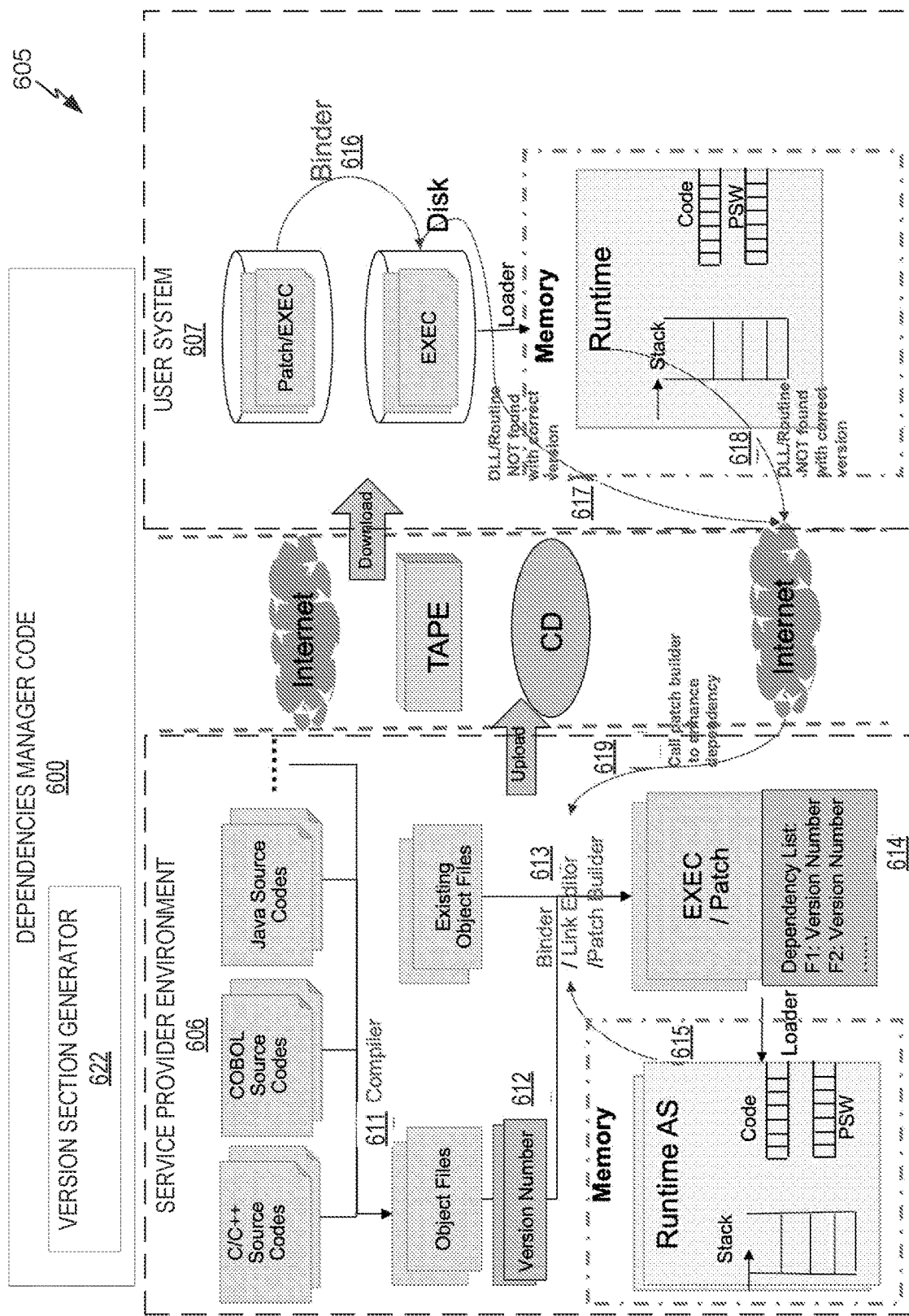
FIG. 6 depicts an illustrative example logical block diagram of a dependencies manager code interacting with and managing dependencies for a software build in a computing environment, in accordance with illustrative aspects of this disclosure.

FIG. 6 depicts an illustrative example logical block diagram of a dependencies manager code 600 interacting with and managing dependencies for a software build in a computing environment 605, in accordance with illustrative aspects of this disclosure. Dependencies manager code 600 may be an implementation of dependencies manager code 200 of FIGS. 1 and 2 and/or dependencies manager code 500 of FIG. 5, in various examples. Dependencies manager code 600 may implement a method to effectively deliver patches and/or install packages for applications, projects, or systems with precise dependency information.

Dependencies manager code 600 may generate dependency information. To generate version sections for software deliverables and/or patches, in some examples, dependencies manager code 600 may include a version section generator 622, which may be implemented as a process or routine that may interact with or be added into compiler and binder. Version section generator 622 may register an event into the compiler, and raise a signal to a daemon process, and the daemon process may call new binder interfaces to write a version section. Version section generator 622 may be comprised in or may be a specific implementation of dependency version determining module 204 and/or dependency section generating module 206 as in FIG. 2 in some examples.

Computing environment 605 includes a service provider environment 606 and a user system 607, in this example. In an example process, dependencies manager code 600 (e.g., an event handler thereof) which has registered a compiler with an event handler (as in step 310 of FIG. 3) detects and observes a compiler processing dependencies from source codes (611) (as in step 320 of FIG. 3) and may incorporate or append version information files to the resulting object files (612). After observing all dependencies that arise in processing by the compiler, this may constitute a complete dependency section with a precise dependency list (as in step 330 of FIG. 3). The source codes may be in any programming language, such as C, C++, COBOL, Java, or any other language. A binder, a link editor, and/or a patch builder may incorporate the dependency information along with object files into a newly built software package, e.g. a new executable and/or a new patch (613) (as in step 340 of FIG. 3), and may patch the target software application with the software package (614) (as in step 350 of FIG. 3). A loader may load the target software application patched with the software package into a runtime in a memory (615). The target software application may be subject iteratively to later patches. The target software application may be uploaded via the Internet or any network system and/or downloaded onto any computer-readable medium (e.g., CD-ROM, tape) and made available to user systems 607, which may be used to download the target software application, and subsequently to download new patches/updates to it A binder on or comprised in a user system may apply new patches/updates to an executable loaded and/or running/executing on the user system (616), which is also an example of step 350 of FIG. 3. If a dependency mismatch or failure is detected in user system 607, either loading from data storage/on disk (617) or running in memory (618) prior to a patching with a precise dependency list as in the present disclosure, user system 607 may make a call to notify the patch builder in service provider environment 606 of the need to update the dependency information (619), which may prompt version section generator to perform one or more of the steps listed above/described herein and to patch the target software application with the software package to provide the precise dependency information on user system 607 (again an example as in step 350 of FIG. 3).

With regard to registering an event into the compiler, for incremental compiling, events may be triggered when the compiler finds there is a source code that needs to be recompiled. For non-incremental compiling, the event may be that the compiler has finished compiling. Dependencies manager code 600 may comprise and provide a new compiler user option set that may include options such that the event handler observing events in or by the compiler can be turned on or off.

With regard to raising a signal to the daemon process, for incremental compiling, when the compiler as modified by dependencies manager code 600 finds there is a source code that needs to be recompiled, the compiler may raise a signal to notify the daemon process. For non-incremental compiling, when the compiler as modified by dependencies manager code 600 finishes compiling all of the source code, the compiler may raise a signal to the daemon process.

With regard to the daemon process calling new binder interfaces to write the version section, for incremental compiling, version section generator 622 may record the compile time and generate version information. For non-incremental compiling, version section generator 622 may compare newly generated objects with the previous version objects. Version section generator 622 may detect and determine if there is any difference between the newly generated objects and the previous version objects. If version section generator 622 determines that there is any difference between the newly generated objects and the previous version objects, other than compiling time, version section generator 622 may record the compiling time and generate and record version information. Version section generator 622 may store each generated version section as part of the corresponding object, or as or in one or more separate files.

Figure 7:
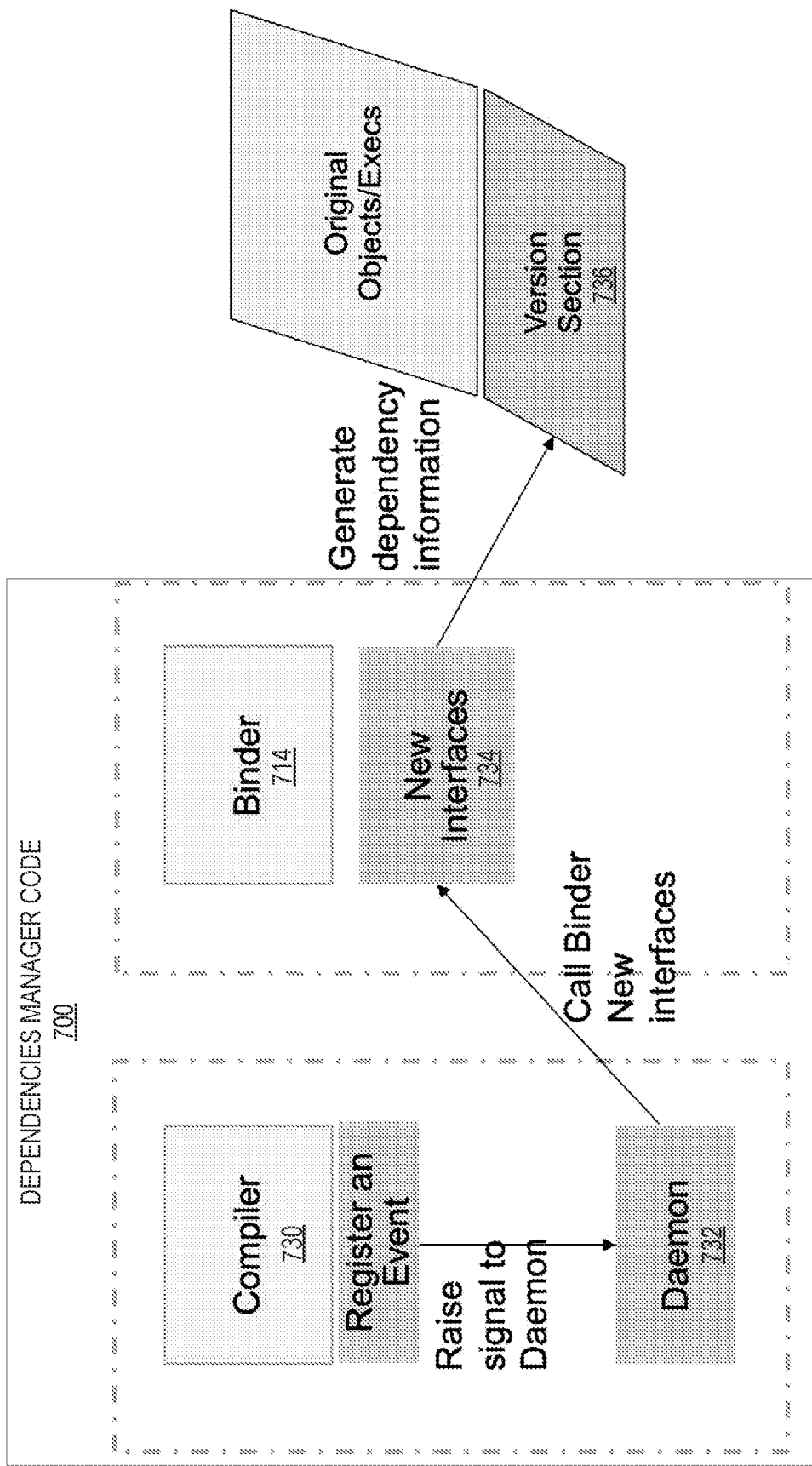
FIG. 7 depicts a conceptual component-process block diagram of a method performed by a dependencies manager code, in accordance with illustrative aspects of this disclosure.

FIG. 7 depicts a conceptual component-process block diagram of a method performed by a dependencies manager code 700, in accordance with illustrative aspects of this disclosure. Dependencies manager code 700 may be an implementation of dependencies manager code 200 of FIGS. 1 and 2, dependencies manager code 500 of FIG. 5, and/or dependencies manager code 600 of FIG. 6, in various examples Dependencies manager code 700 comprises a daemon 732 and a binder 714, in this example. Dependencies manager code 700, having registered a compiler with an event handler (as in step 310 of FIG. 3), registers an event from the compiler 730 and raises a signal to daemon 732. Compiler 730 may be a pre-existing compiler but modified by dependencies manager code 700 in accordance with this disclosure, in various examples. Daemon 732 calls binder 714 with new interfaces 734. Binder 714 generates dependency information (as in step 320 of FIG. 3) and creates a dependency version section/dependency section 736 that comprises the dependency information (as in step 330 of FIG. 3), either as a new part of an object or file, or to attach to or associate with the original object or file.

Figure 8:
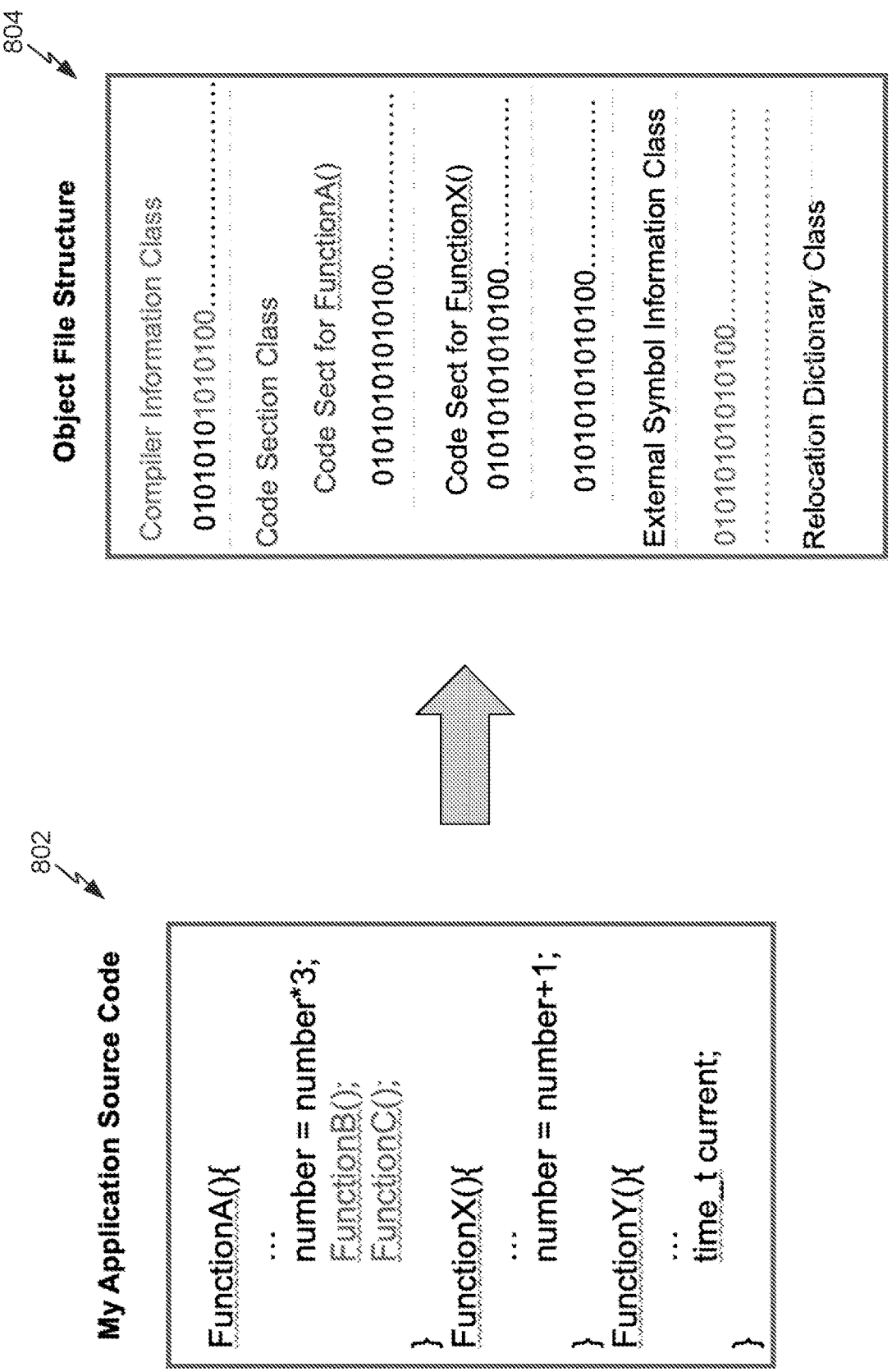
FIG. 8 depicts a conceptual diagram of source code being compiled into an object, in accordance with illustrative aspects of this disclosure.
Figure 9:
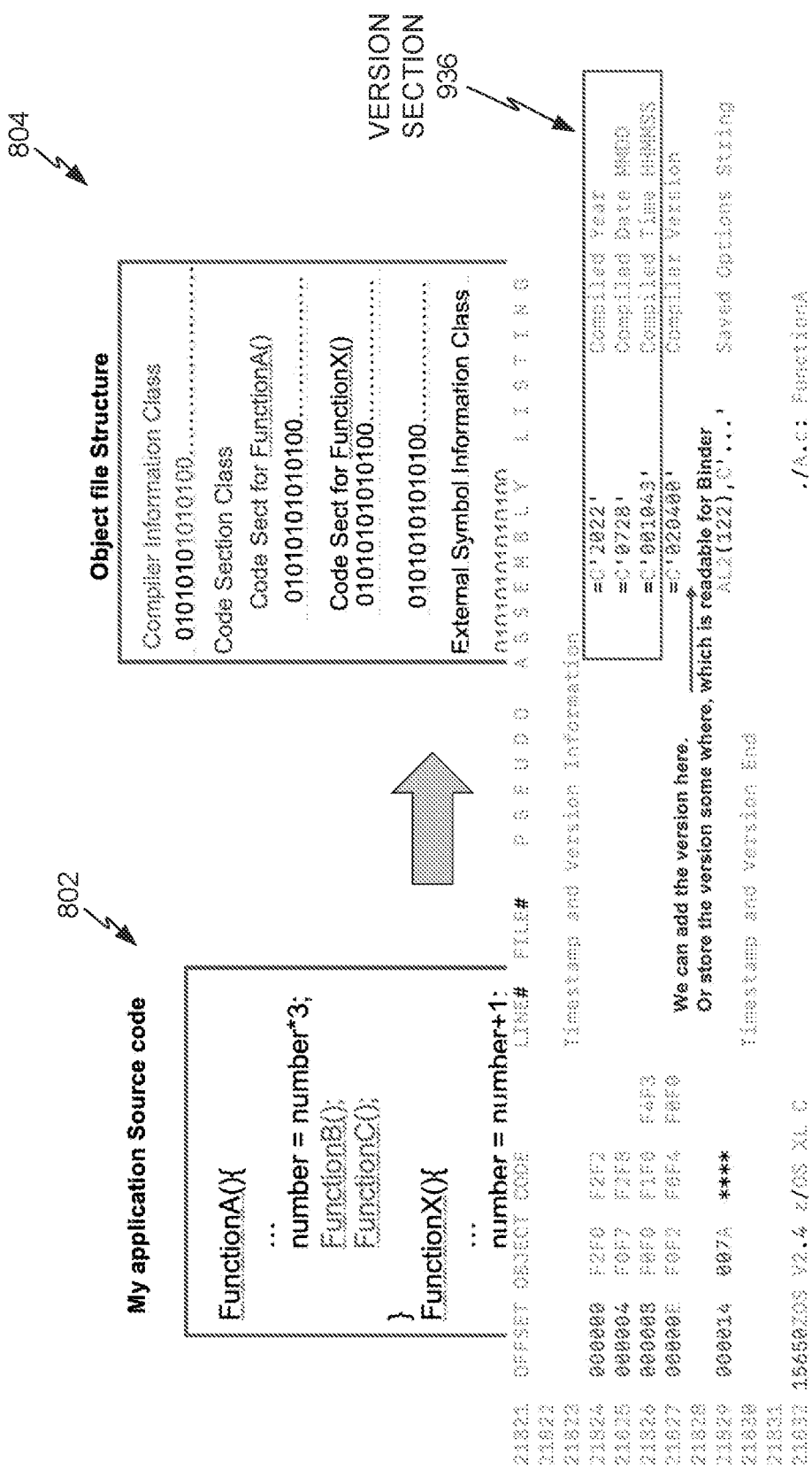
FIG. 9 depicts a conceptual diagram of source code being compiled into object, with an example detailed set of assembly language code of the compiled object in which a dependencies manager code or system of this disclosure has added a version section comprising dependencies timestamp and version information, in accordance with illustrative aspects of this disclosure.

FIG. 8 depicts a conceptual diagram of source code 802 being compiled into an object 804, in accordance with illustrative aspects of this disclosure. Software source code 802 named My Application Source Code is compiled to object 804 with object file structure, e.g., in executable assembly language and/or binary machine code. FIG. 9 also depicts a conceptual diagram of source code 802 being compiled into object 804, with an example detailed set of assembly language code of the compiled object in which a dependencies manager code or system of this disclosure has added a version section 936 comprising dependencies timestamp and version information, in accordance with illustrative aspects of this disclosure. Version section 936 is an illustrative example of version section 736 of FIG. 7.

Figure 10:
FIG. 10 depicts a conceptual diagram of a comparison of source code with an external symbol dictionary, as may be performed by a binder comprised in a dependencies manager code, in accordance with illustrative aspects of this disclosure.

FIG. 10 depicts a conceptual diagram of a comparison of source code with an external symbol dictionary 1004, as may be performed by a binder comprised in a dependencies manager code, such as binder 514 of FIG. 5 and/or binder 714 of FIG. 7, in accordance with illustrative aspects of this disclosure. When building the final executable or patch, the binder resolves all the dependencies and its corresponding version information for the final deliverables. When building the final executable or patch, the binder resolves all the dependencies and the corresponding version information for the final deliverables.

In one example, a dependencies manager code may perform the following steps. A binder and/or a patch builder may resolve all explicit external reference symbols. The binder may find and resolve the transitive dependencies until getting all the final dynamic link library (DLL) files without external symbols. The binder generates new interfaces, as in the example of FIG. 7, and uses the new interfaces to get the version section for the final deliveries and the corresponding dependencies. For objects compiled with version information, the dependencies manager code may add the information to the dependency list. For objects without version information, the dependencies manager code may read into the object and get the compiling time. Calculate the version information, according to the time compiled. The dependencies manager code may generate the dependency list with versions as a stand-alone file, or as part of the final deliverables, such that it can be read by PTF and/or package installation tools.

Figure 11:
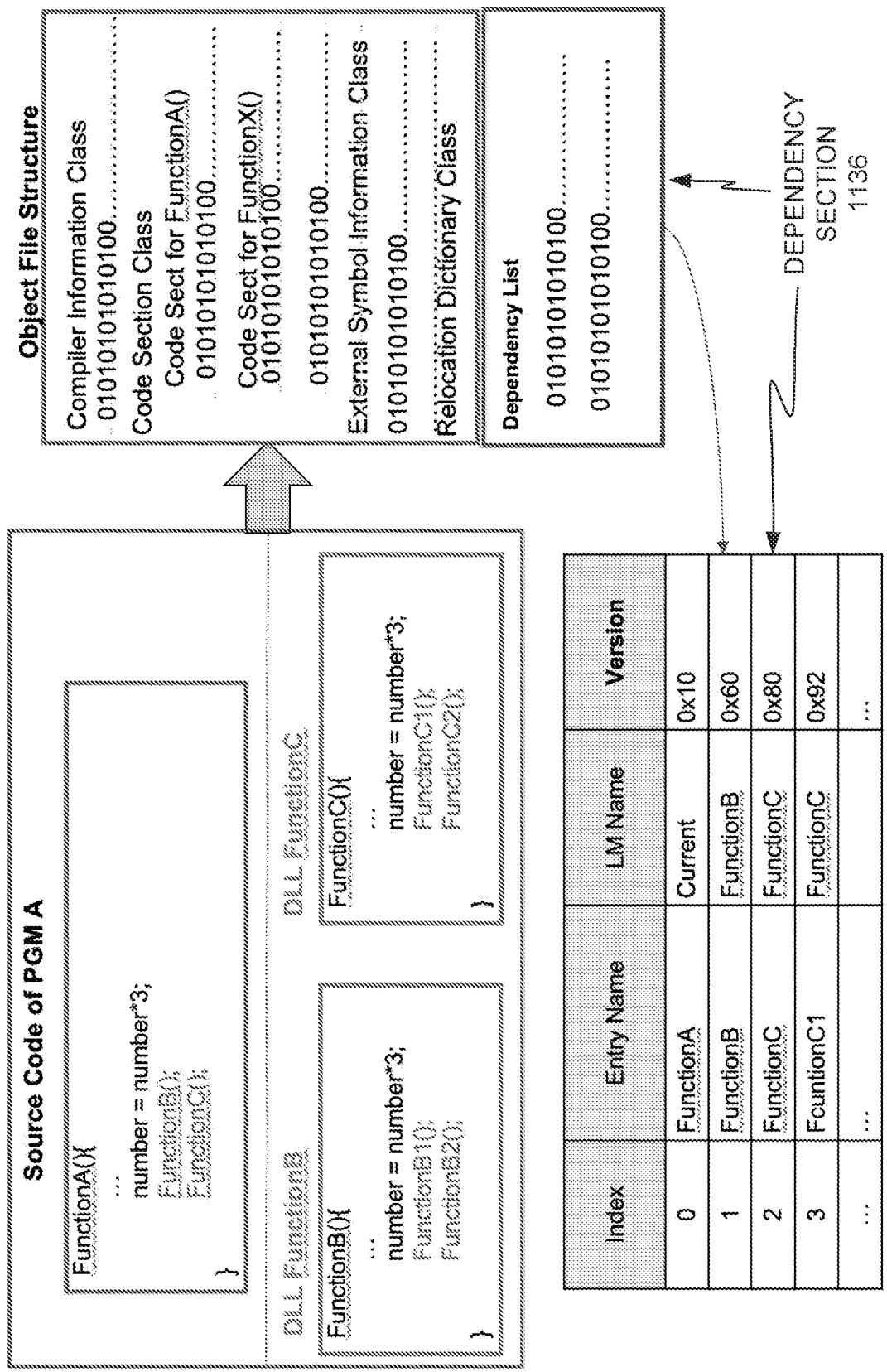
FIG. 11 depicts a conceptual diagram of a source code module, an object generated from the source code module, and a dependency list, shown in two different views in different levels of detail, and generated by a dependencies manager code, in accordance with illustrative aspects of this disclosure.

FIG. 11 depicts a conceptual diagram of a source code module, an object generated from the source code module, and a dependency list 1136, shown in two different views in different levels of detail, and generated by a dependencies manager code, in accordance with illustrative aspects of this disclosure. As in the illustrative example shown, dependency list 1136 includes, for each dependency listed, an index number, an entry name, a load module (LM) name, and a version code.

Figure 12:
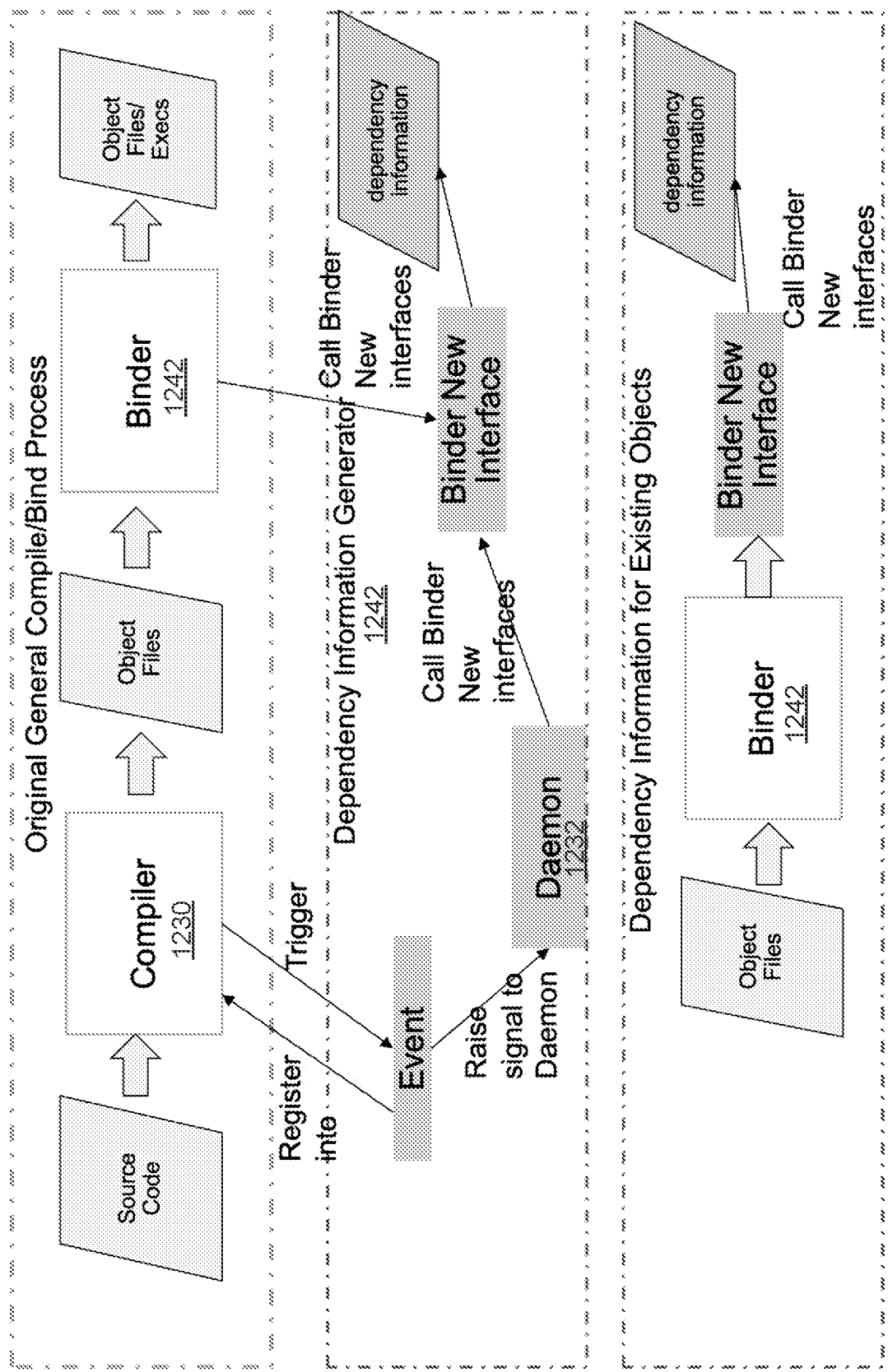
FIG. 12 depicts a conceptual component-process diagram for a dependencies manager code comprising and/or implementing a dependency information generator and interacting with newly compiled objects in a compile and bind process and with existing objects, in accordance with illustrative aspects of this disclosure.

FIG. 12 depicts a conceptual component-process diagram for a dependencies manager code comprising and/or implementing a dependency information generator 1242 and interacting with newly compiled objects in a compile and bind process and with existing objects, in accordance with illustrative aspects of this disclosure. FIG. 12 may be seen as an analogous and supplemental depiction of a dependencies manager code interacting with a compile process compared with FIG. 7. The dependencies manager code comprises and/or acts as a dependency information generator 1242 in interacting with an original general compile and bind process. As shown, dependency information generator 1242 registers into compiler 1230 (as in step 310 of FIG. 3) to trigger compiler 1230 to deliver compiler 1230 to notify of and provide information on dependencies that come up for processing by compiler 1230 Dependency information generator 1242 raises signals to daemon 1232, which calls binder new interfaces with binder 1242, and generates dependency information for all dependencies that arise in processing by compiler 1230 (as in step 320 of FIG. 3, and culminating in step 330 of FIG. 3). Dependency information generator 1242 also analogously generates dependency information for existing objects (also as in step 320 of FIG. 3, and culminating in step 330 of FIG. 3), as shown in the row in the lower one-third section of FIG. 12.

Figure 13:
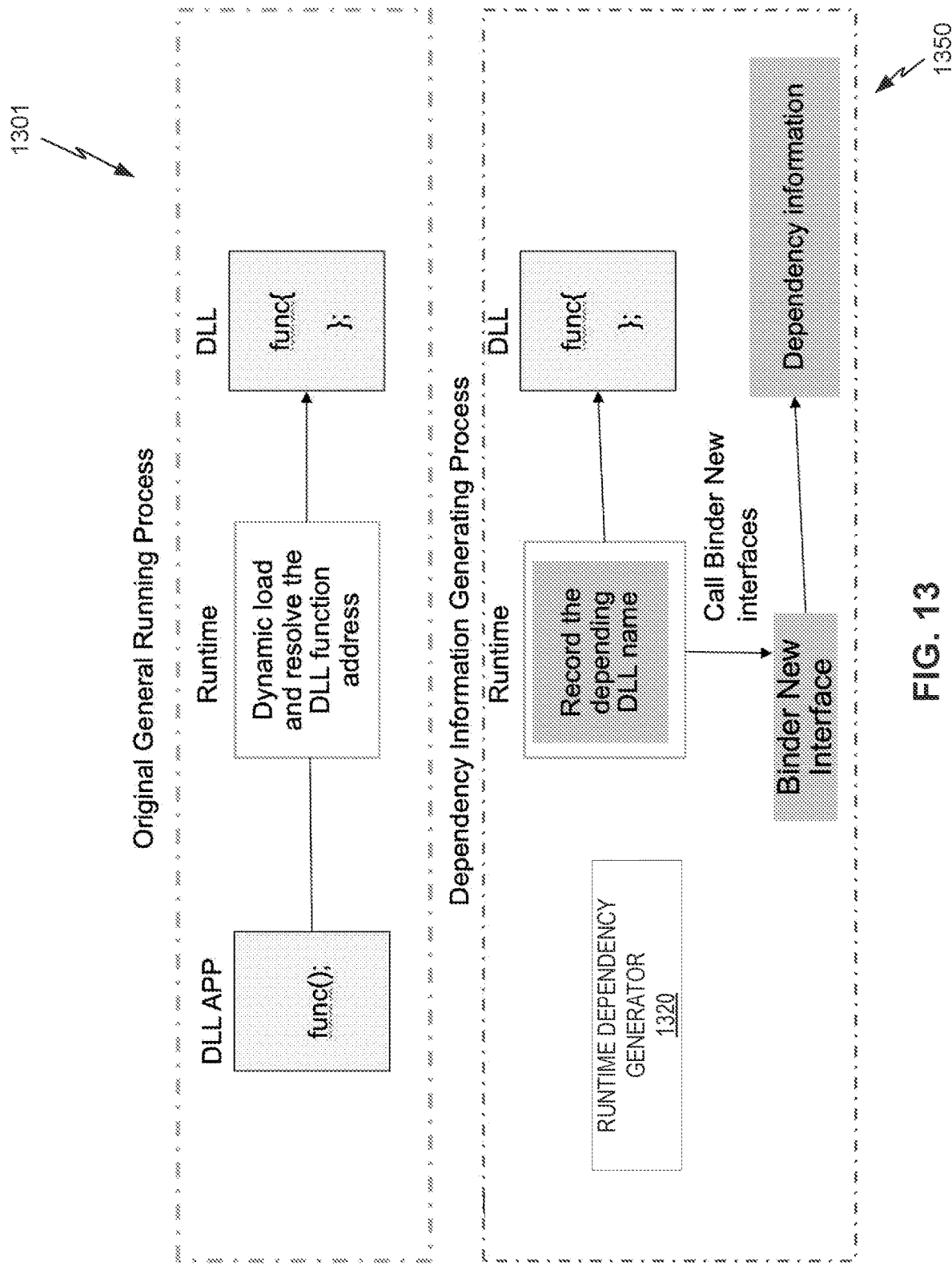
FIG. 13 depicts a comparative conceptual component-process diagram for a dependencies manager code interacting with an original general running process and executing and performing a dependency information generating process, in accordance with illustrative aspects of this disclosure.

FIG. 13 depicts a comparative conceptual component-process diagram for a dependencies manager code interacting with an original general running process 1301 and executing and performing a dependency information generating process 1350, in accordance with illustrative aspects of this disclosure. FIG. 13 may be seen as an analogous and supplemental depiction compared with FIGS. 7 and 12. The dependencies manager code may comprise or act as dependency information generating process 1350 and/or as a runtime dependency generator 1320. Runtime dependency generator 1320 may generate dependency information within a runtime for implicit dependency, which may be a supplemental form of gathering dependency information, supplemental to detecting and observing dependencies from processing events in the compiler, in some examples. Runtime dependency generator 1320 may use a runtime to identify dependencies (e.g., dynamic link libraries (DLLs)) and thereby generate dependency version information (as in step 320 of FIG. 3) in certain situations, such as wild branch or supervisor call hardware instructions (SVC calls) with addresses. Runtime dependency generator 1320 may collect the implicit transitive dependencies when running unit testing (UT), function verification testing (FVT), system verification testing (SVT), and user applications running with the runtime. Within the runtime, runtime dependency generator 1320 may record all the dynamic load (which includes any dependencies that are run in the runtime) and identify all the external function names (e.g., of the dependencies or of functions that use the dependencies in the runtime), call binder new interfaces to read into the load module, and find the corresponding compiling time. The binder new interfaces may determine the version information and record it (also an example of step 320 of FIG. 3).

Figure 14:
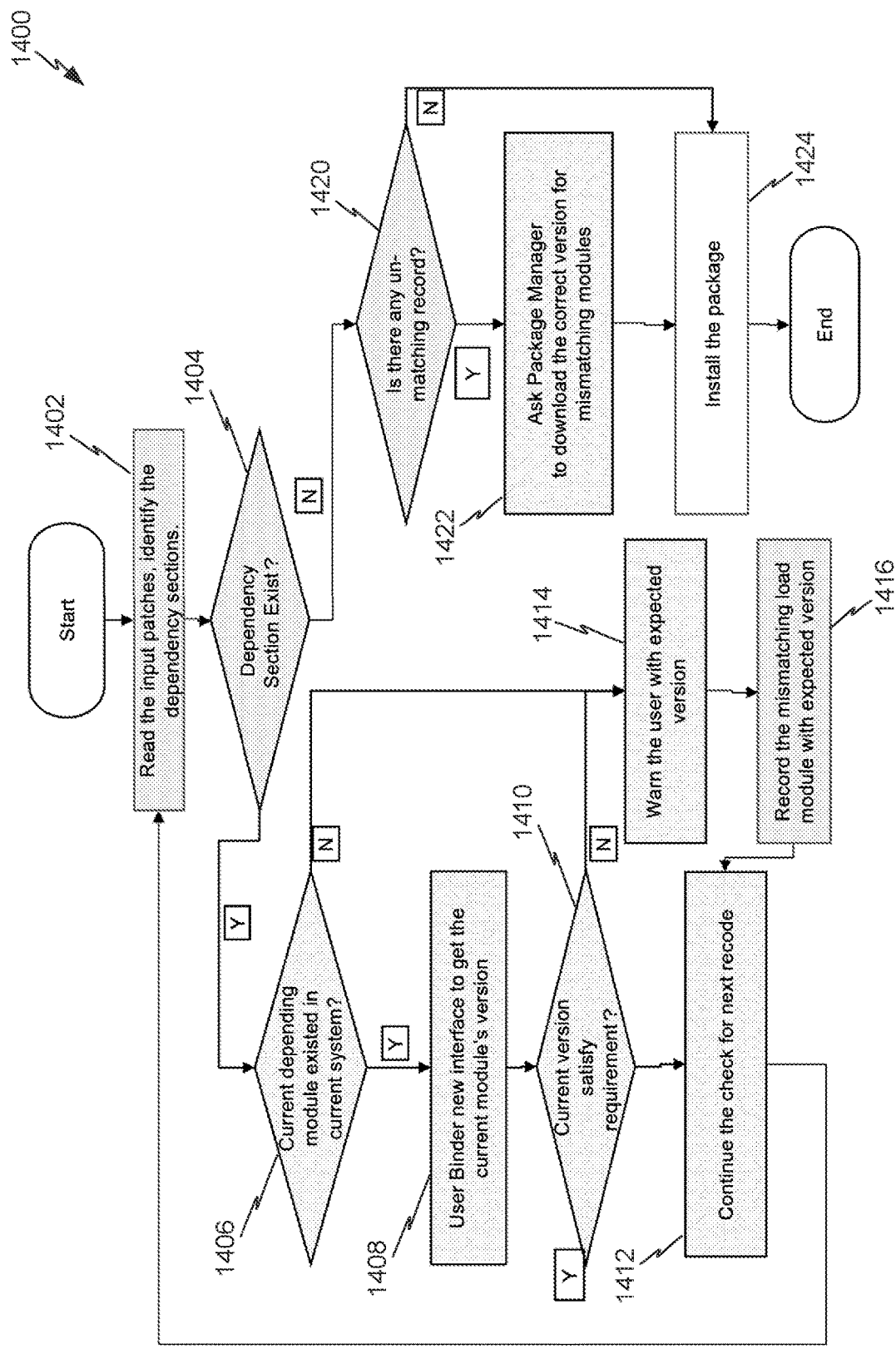
FIG. 14 depicts a flowchart for an installing and patching process that a dependencies manager code may perform, in accordance with illustrative aspects of this disclosure.

FIG. 14 depicts a flowchart for an installing and patching process 1400 that a dependencies manager code may perform, in accordance with illustrative aspects of this disclosure. A dependencies manager code may add a dependency patch component or routine to a link editor or a binder. Certain steps are described as follows as being implemented or performed by the dependency patch component of a dependencies manager code, while any step may also be performed by any component or aspect of a dependencies manager code in various examples. The dependency patch component may read the dependency section in a patch (1402), and for each identified record in the dependency sections: identify the dependency name, load the dependency record into memory, and check if the module of the current record exists (1404). If the module of the current record exists (1406), the dependency patch component may use a binder new interface API to get the current module's version (1408) and determine if the current module satisfies the requirement of the current record (1410). If the current module satisfies the requirement of the current record, the dependency patch component may proceed to the next record (1412). If the current module does not satisfy the requirement of the current record, the dependency patch component may give warning information with the suggested version (1414), and record the mismatching load module with the expected version (1416).

If the dependency patch component determines that the module of the current record does not exist, the dependency patch component may determine if there is any unmatching record (1420) and may give a warning information to the customer with the suggested version for installation. The dependency patch component may ask a package manager to download required load modules for mismatching modules or records (1422), and install a package received in response (1424).

As noted above, a dependencies manager code may generate binder new interfaces, which may contribute in generating and/or identifying a version section. In response to being called by incremental compiler, a dependencies manager code may generate a version section, and add a new section with the version information. If called by a non-incremental compiler to generate the version section, a dependencies manager code may compare the new object or load module with a previous one. If the dependencies manager code determines that the new object or load module is changed, with excluded time in the compiler information section, the dependencies manager code may add a new section with the version information. If a binder new interface is called by a binder or patch builder to build the final deliverables, the binder new interface may identify dependencies in an external symbol dictionary class, e.g., external symbol dictionary 1004 of FIG. 10, and record the external symbol dictionary into a dependency section. If the dependencies manager code is called by a runtime when there is a dynamic load, the dependencies manager code may record it and resolve all the dependencies if it is not in an existing record list. If the dependencies manager code is called by package installation tools, the dependencies manager code may identify the compiling time and/or version information of a new detection or iteration of a required dependency if that required dependency already existed in the dependencies list. The dependencies manager code may output a user notification if a required dependency version does not satisfy a requirement.

A dependencies manager code in various aspects of this disclosure may thus automatically generate and install dependencies without changing the kernel of a compiler and binder; efficiently support and manage software across all kinds of environments, such as docker, VM, hybrid cloud, etc., for any of various high-level languages; help to identify dependencies if critical issues or holes occur, and enable consistent enterprise automation across applications and infrastructure, in various examples. A dependencies manager code in various aspects of this disclosure may be usefully applied for any kind of operation system or service provider that needs to deliver software packages. A dependencies manager code in various aspects of this disclosure may reduce effort for dependency lists required during delivering packages; avoid errors when creating dependency list; and extend capability for product portfolios. A dependencies manager code in various aspects of this disclosure may be used with any production package management delivery system, such as RPM, Yum, NPM for Docker, Linux Advanced Packaging Tool (APT), Maven, and other systems.

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:
generating, by one or more processors, dependency version information for a target software application, based on activity of a compiler registered with an event handler, wherein generating the dependency version information for the target software application comprises the event handler observing the compiler process one or more dependencies for the target software application and determining dependency version information of the one or more dependencies for the target software application;
generating, by the one or more processors, one or more dependency sections with a dependency list for the target software application, wherein the dependency list for the target software application incorporates the dependency version information for the target software application; and
building, by the one or more processors, a software package with the one or more dependency sections with the dependency list for the target software application.

2. The method of claim 1, further comprising registering, by the one or more processors, the compiler with the event handler, prior to generating the dependency version information for the target software application.

3. The method of claim 1, wherein the event handler observes the compiler process the one or more dependencies for the target software application as the one or more dependencies for the target software application are executed by the compiler.

4. The method of claim 1, wherein generating the one or more dependency sections with the dependency list for the target software application comprises generating a direct dependency section and an explicit transitive dependency section.

5. The method of claim 4, wherein generating the one or more dependency sections with the dependency list for the target software application comprises:
identifying an implicit transitive dependency section; and
supplementing the dependency list for the target software application based on the implicit transitive dependency section.

6. The method of claim 5, wherein identifying the implicit transitive dependency section is based on one or more of: unit testing (UT), function verification testing (FVT), system verification testing (SVT), and running on a target platform.

7. The method of claim 5, wherein identifying the implicit transitive dependency section is performed in a runtime.

8. The method of claim 1, wherein generating the one or more dependency sections with the dependency list for the target software application comprises generating version information for one or more dependencies in the dependency list for the target software application.

9. The method of claim 1, wherein generating the one or more dependency sections with the dependency list for the target software application is performed using at least one of a binder, a link editor, and a package builder.

10. The method of claim 1, wherein building the software package with the one or more dependency sections with the dependency list for the target software application comprises building a program temporary fix (PTF) package.

11. The method of claim 1, further comprising patching, by the one or more processors, the target software application with the software package with the one or more dependency sections with the dependency list for the target software application.

12. The method of claim 11, further comprising rebinding, by the one or more processors, a software executable based on the target software application patched with the software package.

13. A computer program product comprising one or more computer readable storage media having program instructions collectively stored on the one or more computer readable storage media, the program instructions executable to:
generate dependency version information for a target software application, based on activity of a compiler registered with an event handler, wherein generating the dependency version information for the target software application comprises the event handler observing the compiler process one or more dependencies for the target software application and determining dependency version information of the one or more dependencies for the target software application;
generate one or more dependency sections with a dependency list for the target software application, wherein the dependency list for the target software application incorporates the dependency version information for the target software application; and
build a software package with the one or more dependency sections with the dependency list for the target software application.

14. The computer program product of claim 13, wherein the program instructions are further executable to register the compiler with the event handler, prior to generating the dependency version information for the target software application,
wherein the event handler observes the compiler process the one or more dependencies for the target software application as the one or more dependencies for the target software application are executed by the compiler.

15. The computer program product of claim 13, wherein the program instructions executable to generate the one or more dependency sections with the dependency list for the target software application are further executable to generate a direct dependency section and an explicit transitive dependency section,
wherein generating the one or more dependency sections with the dependency list for the target software application comprises:
identifying an implicit transitive dependency section; and
supplementing the dependency list for the target software application based on the implicit transitive dependency section,
wherein identifying the implicit transitive dependency section is based on one or more of: unit testing (UT), function verification testing (FVT), system verification testing (SVT), and running on a target platform, and
wherein identifying the implicit transitive dependency section is performed in a runtime.

16. The computer program product of claim 13, wherein the program instructions are further executable to patch the target software application with the software package with the one or more dependency sections with the dependency list for the target software application.

17. A system comprising:
a processor set, one or more computer readable storage media, and program instructions collectively stored on the one or more computer readable storage media, the program instructions executable to:
generate dependency version information for a target software application, based on activity of a compiler registered with an event handler, wherein generating the dependency version information for the target software application comprises the event handler observing the compiler process one or more dependencies for the target software application and determining dependency version information of the one or more dependencies for the target software application;
generate one or more dependency sections with a dependency list for the target software application, wherein the dependency list for the target software application incorporates the dependency version information for the target software application; and
build a software package with the one or more dependency sections with the dependency list for the target software application.

18. The system of claim 17, wherein the program instructions are further executable to register the compiler with the event handler, prior to generating the dependency version information for the target software application,
wherein the event handler observes the compiler process the one or more dependencies for the target software application as the one or more dependencies for the target software application are executed by the compiler.

19. The system of claim 17, wherein the program instructions executable to generate the one or more dependency sections with the dependency list for the target software application are further executable to generate a direct dependency section and an explicit transitive dependency section,
wherein generating the one or more dependency sections with the dependency list for the target software application comprises:
identifying an implicit transitive dependency section; and
supplementing the dependency list for the target software application based on the implicit transitive dependency section, wherein identifying the implicit transitive dependency section is based on one or more of: unit testing (UT), function verification testing (FVT), system verification testing (SVT), and running on a target platform, and wherein identifying the implicit transitive dependency section is performed in a runtime.

20. The system of claim 17, wherein the program instructions are further executable to patch the target software application with the software package with the one or more dependency sections with the dependency list for the target software application.

* * * * *